(12) United States Patent
Momose et al.

(10) Patent No.: US 7,220,304 B2
(45) Date of Patent: *May 22, 2007

(54) MODIFIED CARBON BLACK DISPERSION LIQUID AND WATER BASE INK CONTAINING THE SAME

(76) Inventors: Masayuki Momose, c/o Seiko Epson Corporation, 3-5, Owa 3-chome, Suwa-shi Nagano-ken 392-8502 (JP); Miharu Kanaya, c/o Seiko Epson Corporation, 3-5, Owa 3-chome, Suwa-shi Nagano-ken 392-8502 (JP); Sohko Itoh, c/o Orient Chemical Industries., Ltd, 7-14, Shinmori 1-chome, Asahi-ku, Osaka-shi, Osaka 535-0022 (JP); Tatsuya Yagyu, c/o Orient Chemical Industries, Ltd., 7-14, Shinmori 1-chome, Asahi-ku, Osaka-shi, Osaka 535-0022 (JP)

( * ) Notice: Subject to any disclaimer, the term of this patent is extended or adjusted under 35 U.S.C. 154(b) by 2 days.

This patent is subject to a terminal disclaimer.

(21) Appl. No.: 10/517,951

(22) PCT Filed: Apr. 23, 2004

(86) PCT No.: PCT/JP2004/005908

§ 371 (c)(1),
(2), (4) Date: May 2, 2005

(87) PCT Pub. No.: WO2004/094537

PCT Pub. Date: Nov. 4, 2004

(65) Prior Publication Data

US 2005/0204957 A1 Sep. 22, 2005

(30) Foreign Application Priority Data

Apr. 23, 2003 (JP) .............................. 2003-117995

(51) Int. Cl.
*C09D 11/00* (2006.01)
(52) U.S. Cl. .................. 106/31.9; 106/31.6; 106/31.86
(58) Field of Classification Search ................ 106/31.9, 106/31.6, 31.86
See application file for complete search history.

(56) References Cited

U.S. PATENT DOCUMENTS

| | | | | |
|---|---|---|---|---|
| 4,443,263 A | * | 4/1984 | Dietz et al. ............ | 106/287.24 |
| 4,632,867 A | * | 12/1986 | Kuse et al. .................. | 428/323 |
| 5,032,369 A | * | 7/1991 | Kondo et al. ................ | 423/339 |
| 5,609,671 A | | 3/1997 | Nagasawa | |
| 5,718,746 A | | 2/1998 | Nagasawa et al. | |
| 5,965,248 A | * | 10/1999 | Saitoh et al. ............ | 428/842.3 |
| 6,468,342 B1 | * | 10/2002 | Itoh et al. .................... | 106/478 |

FOREIGN PATENT DOCUMENTS

| | | |
|---|---|---|
| JP | 61-000919 | 1/1986 |
| JP | 2000-319573 | 11/2000 |
| JP | 2000-345085 | 12/2000 |
| JP | 2000-345086 | 12/2000 |
| JP | 2001-081355 | 3/2001 |
| WO | 00/75246 | 12/2000 |

OTHER PUBLICATIONS

English Abstract of WO 00/75246 dated Dec. 14, 2000.
Patent Abstracts of Japan and JPO computer generated English translation JP 2000-345085 dated Dec. 12, 2000.
Patent Abstracts of Japan and JPO computer generated English translation JP 2000-345086 dated Dec. 12, 2000.
Patent Abstracts of Japan of JP 61-000919 dated Jan. 6, 1986.
Patent Abstracts of Japan and JPO computer generated English translation JP 2000-319573 dated Nov. 21, 2000.
Patent Abstracts of Japan and JPO computer generated English translation JP 2001-081355 dated Mar. 27, 2001.

* cited by examiner

*Primary Examiner*—J. A. Lorengo
*Assistant Examiner*—Veronica Faison-Gee
(74) *Attorney, Agent, or Firm*—Ladas and Parry LLP

(57) ABSTRACT

The present invention provides a water-based ink that is used in ink jet printer printing, with a writing instrument, or the like, that has a low settling rate and for which clogging is not prone to occurring, that can be stored stably for a long period without the viscosity or the carbon black particle diameter increasing, and for which printing with a deep black color and a high print density is possible, and a modified carbon black dispersion used for preparing this water-based ink. The present invention is a liquid having dispersed therein a modified carbon black obtained by subjecting a carbon black raw material powder to oxidation treatment, wherein the modified carbon black has on the surface thereof (a) carboxyl groups, and (b) lactone groups in a molar amount of at least 500 µmol/g relative to the weight of the modified carbon black and a molar ratio of 0.8 to 1.1 times the amount of the carboxyl groups.

20 Claims, No Drawings

MODIFIED CARBON BLACK DISPERSION LIQUID AND WATER BASE INK CONTAINING THE SAME

BACKGROUND

The present invention relates to a dispersion having a modified carbon black dispersed therein, and a water-based ink containing the dispersion, which can be used for a recording liquid, in a writing instrument, and so on.

Carbon black is widely used as a colorant in water-based inks for printing a black color with ink jet printers.

In general a carbon black raw material powder comprises a secondary agglomerated mass called an agglomerate formed through van der Waals attraction or mere congregation, adhesion or interlocking between aggregates that are primary aggregated bodies in each of which approximately spherical primary particles are congregated together. In an untreated state, such a carbon black raw material powder will not disperse in water but rather will settle rapidly.

A water-based ink containing such a carbon black raw material powder and a dispersant for dispersing the carbon black raw material powder in water has high viscosity, and hence printing is difficult. Modified carbon blacks obtained by oxidizing the surface of the carbon black raw material powder to introduce hydrophilic functional groups such as carboxyl groups so that dispersion of the carbon black raw material powder in water becomes easy even if a dispersant is not used are thus used.

As such a modified carbon black, in Patent Document 1 the present applicants have disclosed one for which the specific surface area and the DBP oil absorption (the amount of dibutyl phthalate absorbed by 100 g of the carbon black) are specified.

(Patent Document 1) Japanese Patent Application Laid-open No. 2000-319573

Water-based inks containing this modified carbon black have a low viscosity, and moreover have a high print density, and hence dense printing with a deep black color is possible. When using such a water-based ink as an ink jet recording ink, the water-based ink must have sufficient stability over time for practical use. Water-based inks hitherto have not always had sufficient storage stability, with the viscosity increasing, or the carbon black particles further agglomerating and hence settling becoming prone to occurring, after a long period has elapsed. There have thus been calls for water-based inks for which the settling rate is yet lower and clogging is yet less prone to occurring.

SUMMARY

The present invention was accomplished to resolve the above problems; it is an object of the present invention to provide a water-based ink that is used in ink jet printer printing, that has a low settling rate and for which clogging is not prone to occurring, that can be stored stably for a long period without the viscosity or the carbon black particle diameter increasing, and for which printing with a deep black color and a high print density is possible, and a modified carbon black dispersion used for preparing g this water-based ink.

The present invention provides a modified carbon black dispersion that is a liquid having dispersed therein a modified carbon black obtained by subjecting a carbon black raw material powder to oxidation treatment, and is characterized in that the modified carbon black has on the surface thereof (a) carboxyl groups, and (b) lactone groups in a molar amount of at least 500 µmol/g relative to the weight of the modified carbon black and a molar ratio of 0.8 to 1.1 times the amount of the carboxyl groups.

DETAILED DESCRIPTION

A modified carbon black dispersion of the present invention that has been made to attain the above object has dispersed therein a modified carbon black obtained by subjecting a carbon black raw material powder to a suitable degree of. oxidation treatment. The modified carbon black is one in which lactone groups and carboxyl groups have been further introduced onto the surface of the carbon black raw material powder through this oxidation treatment. The modified carbon black has on the surface thereof (a) carboxyl groups, and (b) lactone groups in a molar amount of at least 500 µmol/g, preferably at least 600 µmol/g, more preferably 700 to 900 µmol/g, relative to the weight of the modified carbon black and a molar ratio of 0.8 to 1.1 times, preferably 0.85 to 1.05 times, more preferably 0.9 to 1.0 times, the amount of the carboxyl groups.

The molar amount of the carboxyl groups on the surface of the modified carbon black relative to the weight of the modified carbon black is preferably at least 700 µmol/g, more preferably 700 to 900 µmol/g.

With the modified carbon black having carboxyl groups and lactone groups, which are hydrophilic functional groups, in amounts in the above ranges, large electrostatic repulsive forces act between the molecules, and accompanying the amount of lactone groups being relatively high, agglomeration becomes not prone to occurring. Furthermore, because the modified carbon black has hydrophilic functional groups, there is strong interaction between the modified carbon black and water, and because the carboxyl groups and lactone groups are present on the surface of the carbon black in a suitable ratio, the modified carbon black is readily dispersed in water, and hence the dispersion is stable, with settling not being prone to occurring.

The modified carbon black can thus be dispersed and/or dissolved in water even if a dispersant is not present. A dispersion having a desired modified carbon black concentration can be prepared by adding water to the modified carbon black and then carrying out concentration or the like. As necessary, suitable freely chosen additives such as water-soluble organic solvents and preservatives may be added to the dispersion.

The modified carbon black dispersion has excellent stability upon temperature change. The percentage change in the mean particle diameter upon 5 weeks elapsing at 70° C. is preferably not more than 15%, more preferably not more than 10%. This percentage change is a problem in particular in the case that there is a marked increase in the mean particle diameter.

Moreover, the modified carbon black dispersion has excellent stability, with changes in viscosity not occurring. The percentage change in the viscosity upon 5 weeks elapsing at 70° C. is preferably not more than 10%. This percentage change is a problem in particular in the case that there is a marked increase in the viscosity.

The carbon black raw material powder is manufactured using a publicly known carbon black manufacturing method, and may be a carbon black obtained using a furnace method, a carbon black obtained using a channel method, or the like. The furnace method is a carbon black raw material powder manufacturing method in which a fuel (gas or oil) and air are introduced into a special combustion furnace lined with bricks able to withstand high temperatures of up to approximately 2000° C., complete combustion is carried out and a high-temperature atmosphere of at least 1400° C. is formed, and then a liquid raw material oil is continuously sprayed in and pyrolyzed, water is sprayed onto the high-temperature gas containing carbon black produced at a latter stage in the furnace to stop the reaction, and then separation into the carbon black and exhaust gas is carried out using a bag filter. Through such a manufacturing method, small amounts of lactone groups and carboxyl groups are introduced onto the surface of the carbon black raw material powder. It has been found that, along with the manufacturing method, this phenomenon is deeply involved in the shape of the carbon black structure and the surface structure, and moreover this is an important factor for the modified carbon black obtained by oxidizing the carbon black raw material powder.

The modified carbon black is preferably one obtained by carrying out oxidation treatment on a carbon black raw material powder that already has on the surface thereof carboxyl groups, and lactone groups in a molar amount of at least 20 μmol/g relative to the weight of the carbon black raw material powder and a molar ratio of 0.65 to 1.1 times the amount of the carboxyl groups.

Moreover, the modified carbon black is preferably one obtained by carrying out oxidation treatment on a carbon black raw material powder having a primary particle diameter (mean value of the primary particle diameter) of 11 to 18 nm, a BET specific surface area of at least 180 $m^2/g$, preferably 180 to 260 $m^2/g$, and a DBP oil absorption (the amount of dibutyl phthalate absorbed by 100 g of the carbon black raw material powder; referred to as the 'DBP oil absorption' in the present specification) of at least 180 mL/100 g, preferably 180 to 300 mL/100 g, more preferably 190 to 250 mL/100 g.

With a modified carbon black obtained from a carbon black raw material powder having such a primary particle diameter, even if the mean particle diameter of the modified carbon black is 150 to 250 nm, the settling rate for a water-based ink containing the modified carbon black will be kept down to not more than 30%, clogging of the nozzles of an ink jet printer from which the water-based ink is ejected, settling, and degeneration will not be prone to being brought about, and the water-based ink will exhibit a practicable long-term storage stability of several years.

The modified carbon black has good dispersion stability, and hence the settling rate is low for the carbon black dispersion and also the water-based ink of the present invention. This settling rate is expressed as the percentage change obtained upon centrifuging a liquid that has been prepared to a modified carbon black concentration of 5 wt %, diluting the liquid before and after the centrifugation, and measuring the absorbance at a wavelength of 500 nm in each case.

Specifically, the settling rate is measured as follows.

30 g of a liquid prepared to 5 wt % of the modified carbon black, 10 wt % of glycerol and 10 wt % of diethylene glycol mono-n-butyl ether is sealed in a settling tube, and centrifugation is carried out for 10 minutes with a gravity acceleration of 11000 G. 4 g of the supernatant is weighed out accurately, and is diluted in a 1 L measuring flask. The diluted liquid is measured out into a 5 mL transfer pipette, and is diluted in a 100 mL measuring flask. The absorbance W1 of this liquid at a wavelength of 500 nm is measured. The absorbance W0 upon similarly diluting the prepared liquid before centrifugation is measured, and the settling rate is calculated from the following formula.

$$\text{Settling rate (\%)} = (1 - [\text{absorbance } W1/\text{absorbance } W0]) \times 100 \quad \text{[Equation 1]}$$

The modified carbon black preferably has a settling rate as obtained as described above of not more than 30%, more preferably not more than 25%.

As a result, even if the mean particle diameter of the modified carbon black is relatively large as with the previously mentioned range, a carbon black dispersion containing the modified carbon black having such a settling rate, or a water-based ink prepared using this dispersion, will be stable, with degeneration not being prone to occurring and settling not occurring even upon long-term storage for several years. Moreover, in the case of using such a water-based ink in an ink jet printer, smooth printing will be possible, with clogging of the ink ejection nozzles of the ink jet printer not being brought about. Furthermore, such a dispersion or ink has a high OD value, and hence dense printing and so on with a deep black color is possible. On the other hand, with an ink using a carbon black exhibiting a settling rate exceeding the above-mentioned range, settling upon long-term storage and/or clogging may occur.

The method of subjecting the carbon black raw material powder to the oxidation treatment may be, for example, an oxidation method using contact with air, a gas phase oxidation method using reaction with a nitrogen oxide or ozone, a liquid phase oxidation method using an oxidizing agent such as nitric acid, potassium permanganate, potassium dichromate, chlorous acid, perchloric acid, a hypohalite, hydrogen peroxide, a bromine aqueous solution or an ozone aqueous solution, or the like. The surface may be modified through plasma treatment or the like.

A particularly preferable oxidation treatment method is a method in which the carbon black raw material powder is subjected to wet oxidation using a hypohalous acid or a hypohalite. Specific examples of such a hypohalite are sodium hypochlorite and potassium hypochlorite, with sodium hypochlorite being more preferable from the standpoint of the reactivity.

A method of manufacturing the carbon black dispersion has, for example, at least the steps of adding an aqueous solution of a hypohalous acid and/or a hypohalite to a liquid obtained by suspending a carbon black raw material powder prepared using the furnace method in water and thus carrying out oxidation treatment to obtain a modified carbon black, stirring in a disperser with a 0.6 to 3 mm-diameter milling medium, filtering with 100 to 500 mesh wire netting, and desalinizing the filtrate using an ultrafilter membrane, whereby the dispersion is obtained.

By carrying out the oxidation treatment using an aqueous solution of a hypohalous acid or a hypohalite, preferably sodium hypochlorite, as an oxidizing agent, the surface of the carbon black raw material powder is oxidized, and lactone groups, carboxyl groups and so on are introduced. The amount used of the hypohalous acid or hypohalite is adjusted as appropriate in accordance with the BET specific surface area of the carbon black raw material powder.

By subjecting the carbon black raw material powder to oxidation treatment with a hypohalous acid or hypohalite having a chlorine amount relative to the surface area of the carbon black raw material powder of $0.6 \times 10^{-4}$ to $2.5 \times 10^{-4}$ mol/$m^2$, preferably $0.6 \times 10^{-4}$ to $1.5 \times 10^{-4}$ mol/$m^2$, a modified carbon black having good stability is obtained.

It is preferable to adjust the amount of the hypohalous acid or hypohalite such that the lower the BET specific surface area, the lower the amount of the hypohalous acid or hypohalite is made to be, and the greater the BET specific surface area, the greater the amount of the hypohalous acid or hypohalite is made to be. This is because the lower the BET specific surface area, the fewer the active sites that will react with the hypohalous acid or hypohalite, whereas the greater the specific surface area, the greater the active sites that will react with the hypohalous acid or hypohalite. There will be no impediment to the reaction even if the hypohalous acid is added in an amount greater than the amount that will react with the active sites, but the hypohalous acid will be used wastefully, and it will become necessary to carry out extra desalination. If the reaction is carried out with an amount of hypohalous acid less than the amount that will react with the active sites, then the desired amounts of lactone groups and carboxyl groups will not be reached, and hence the settling rate will increase, and as a result the long-term storage stability will drop.

When suspending the carbon black raw material powder in water, so that it will be possible to carry out the oxidation treatment suitably, it is important to mix the carbon black into the water thoroughly. Dispersion may be carried out using a high-load disperser, a high-speed stirrer or the like. A water-soluble solvent may be impregnated into the carbon black in advance. Alternatively, dispersion may be carried out using a water/water-soluble solvent mixed system.

In the step of subjecting the carbon black to the oxidation treatment and dispersion/pulverization, a ball mill, an attritor, a flow jet mixer, an impeller mill, a colloidal mill, a sand mill (e.g. one commercially sold under the trade name 'Super Mill', 'Agitator Mill', 'Dyno-mill' or 'Beads Mill') or the like may be used as a disperser/pulverizer. At this time, a milling medium does not necessarily have to be used, but is preferably used. The milling medium is preferably one having a diameter of 0.6 to 3 mm, with specific examples being glass beads, zirconia beads, magnetic beads, stainless steel beads and so on. The conditions in the step of dispersing while oxidizing are preferably 3 to 10 hours at 10 to 70° C. with a rotational speed of at least 500 rpm. The oxidation reaction will generally proceed more readily the higher the reaction temperature, but if the temperature is too high then the hypohalite will decompose, and hence it is preferable to carry out the reaction at 40 to 60° C.

The filtration with wire netting is carried out to remove coarse particles and the milling medium. The filtrate obtained may be subjected to pH adjustment. Excess acid in the filtrate obtained and by-product water-soluble acidic groups may be neutralized using a basic substance. Examples of such a basic substance are alkali metal hydroxides such as sodium hydroxide, potassium hydroxide and lithium hydroxide, ammonia or ammonia water, and amine compounds. Examples of amine compounds include water-soluble volatile amines and alkanolamines. Specific examples are volatile amines substituted with alkyl groups having 1 to 3 carbon atoms (e.g. methylamine, trimethylamine, diethylamine, propylamine), alkanolamines substituted with alkanol groups having 1 to 3 carbon atoms (e.g. ethanolamine, diethanolamine, triethanolamine, triisopropanolamine), and alkylalkanolamines substituted with alkyl groups having 1 to 3 carbon atoms and alkanol groups having 1 to 3 carbon atoms.

The desalination of the filtrate obtained as described above is carried out using, for example, an ultrafilter membrane, until the electrical conductivity of the filtrate is not more than 1.5 mS/cm. If the desalination is stopped outside this range, then impurities such as NaCl will be contained in the ink in a large amount, and hence the storage stability of the ink will become poor. Moreover, to prepare a yet more stable ink, the desalination may be carried out using a combination of various desalination methods. Through the above method, a desalinated pigment dispersion can be obtained.

A modified carbon black obtained from such a desalinated dispersion will have an electrical conductivity of not more than 0.7 mS/cm, and can be used for preparing an ink having good storage stability.

After the desalination, coarse particles of size greater than 1 μm may be further removed using a centrifuge or a filter, thus obtaining a dispersion. This is because coarse particles readily settle whereby the settling rate increases, and moreover may cause clogging of the ink ejection nozzles of an ink jet printer.

A water-based ink of the present invention contains the above modified carbon black dispersion. Due to containing the modified carbon black, the water-based ink enables high-quality dense printing with a vivid deep black color, and has good storage stability, with settling not being prone to occurring even upon long-term storage. 0.1 to 20 wt %, preferably 1 to 15 wt %, of the modified carbon black is contained relative to the total amount of the water-based ink. At a modified carbon black content of less than 0.1 wt %, the printing or writing density may be insufficient, whereas if this content exceeds 20 wt %, then the viscosity of the water-based ink will increase dramatically, and hence the stability during ink ejection may drop.

Moreover, the water-based ink preferably has a penetrability such that the penetration time upon applying the ink onto a recording medium such as paper in an amount of 1 mg/cm$^2$ is less than 1 second. Specifically, an ink for which the penetration time upon applying the ink in an amount of 1 mg/cm$^2$ is less than 1 second means a water-based ink for which, for example, in the case of applying 50 ng of the water-based ink onto a 360 dpi (dot/inch)×360 dpi area, the time period until there is no longer any soiling with ink upon touching the printed surface is less than 1 second.

To make the ink have such a penetrability, penetrating agent such as surfactant(s) and/or water-soluble organic solvent(s) according to which the surface tension of an aqueous solution is lowered is/are added to the ink in a suitable amount in accordance with the recording medium. The wettability of the ink to the recording medium is thus improved, and as a result the penetrability of the ink is increased.

Examples of water-soluble organic solvents are lower alcohols such as ethanol and propanol, cellosolves such as ethylene glycol monomethyl ether and ethylene glycol monoethyl ether, carbitols such as diethylene glycol monomethyl ether and diethylene glycol monoethyl ether, and 1,2-alkyldiols such as 1,2-hexanediol and 1,2-octanediol. Of these, glycol butyl ether type water-soluble organic solvents such as diethylene glycol monobutyl ether and triethylene glycol monobutyl ether are particularly preferable due to giving excellent penetrability.

Moreover, examples of surfactants include anionic surfactants such as fatty acid salts and alkylsulfuric acid ester salts, nonionic surfactants such as polyoxyethylene alkyl ethers and polyoxyethylene phenyl ethers, cationic surfactants, and amphoteric surfactants. Of these, nonionic surfactants are preferable due to causing little foaming, with acetylene glycol type nonionic surfactants being particularly preferable due to giving excellent penetrability.

Such water-soluble organic solvent(s) and/or surfactant(s) may be used alone or together as penetrating agent. It is preferable to add the penetrating agent to the water-based ink while adjusting such that the surface tension of the water-based ink at 20° C. becomes not more than 45 mN/m, preferably not more than 40 mN/m.

A humectant may be added to the water-based ink, this being to prevent the ink from drying at the tips of the nozzles from which the ink is ejected in the case of using the ink in ink jet recording. The humectant is selected from materials having high hygroscopicity and water-solubility. Specific examples are polyols such as glycerol, ethylene glycol, diethylene glycol, triethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol and pentaerythritol, lactams such as 2-pyrrolidone, N-methyl-2-pyrrolidone and F-caprolactam, urea compounds such as urea, thiourea, ethyleneurea and 1,3-dimethylimidazolidinone, and saccharides such as maltitol, sorbitol, gluconolactone and maltose. There are no particular limitations on the amount used of the humectant, but in general this amount is in a range of 0.5 to 50 wt %.

Additives such as fixing agents, pH modifier, antioxidants, ultraviolet absorbers, preservatives and anti-mold agents may also be added to the water-based ink as required.

The water-based ink may be, for example, one prepared to 5 wt % of the modified carbon black, 10 wt % of glycerol and 10 wt % of diethylene glycol mono-n-butyl ether. In the case of applying on 1 mg/cm$^2$ of such a water-based ink, the reflection density (OD value) upon subjecting the ink layer to measurement with a Macbeth densitometer is at least 1.4.

This indicates that if printing is carried out with this water-based ink, then high-quality dense printed characters or images having a deep black color are obtained.

This water-based ink can be suitably used as an ink for which long-term stability is required, for example an ink for ink jet recording in which ink droplets are ejected and attached onto a recording medium, or can also be used as any of various inks for writing instruments, for stamps or the like. With a water-based ball pen in which this water-based ink is used as a writing ink composition, the recording/writing properties are good, and writing with no unevenness in the written marks is possible, and moreover there is no patchiness of the characters even in the case of writing rapidly.

A recording method of the present invention comprises carrying out recording on a recording medium by attaching the ink.

This recording method may be an ink jet recording method comprising carrying out printing by ejecting droplets of the water-based ink and attaching the droplets onto the recording medium. This method may be carried out using any of various methods in which the water-based ink is ejected as droplets from fine nozzles and the droplets are attached onto the recording medium.

Several of these methods will now be described. A first method is an electrostatic attraction method. In this method, a strong electric field is applied between the nozzles and accelerating electrodes placed in front of the nozzles, thus continuously ejecting the ink from the nozzles as droplets; there are a form in which recording is carried out by applying printing information signals to deflecting electrodes while the ink droplets are flying between the deflecting electrodes, and alternatively a form in which the ink droplets are not deflected but rather are ejected out in correspondence with printing information signals.

A second method is a method in which pressure is applied to ink droplets with a small pump, and the nozzles are mechanically vibrated using a quartz oscillator or the like, thus forcibly ejecting the ink droplets. The ejected ink droplets are charged at the same time as being ejected, and printing information signals are applied to deflecting electrodes while the ink droplets are flying between the deflecting electrodes, thus carrying out recording.

A third method is a method using a piezoelectric element, this being a method in which pressure and printing information signals are simultaneously applied to the ink by the piezoelectric element, thus ejecting ink droplets and carrying out recording.

A fourth method is a method in which the ink is subjected to rapid volume expansion through the action of thermal energy, this being a method in which the ink is heated to form bubbles by microelectrodes in accordance with printing information signals, thus ejecting ink droplets and carrying out recording.

The ink jet recording method may be carried out using any of the above methods.

A recorded article of the present invention is obtained through recording being carried out using the water-based ink. This recorded article has a high print density, has a deep black color, and is vivid and of high quality.

EXAMPLES

Following is a detailed description of examples of carbon black dispersions and water-based inks of the present invention.

Examples 1 to 3 show examples in which a modified carbon black dispersion to which the present invention is applied is prepared.

Example 1

Preparation of Dispersion A 500 g of a carbon black raw material powder prepared using the furnace method (primary particle diameter=18 nm, BET specific surface area=180 m$^2$/g, DBP oil absorption=186 mL/100 g) was added into 3750 g of ion exchange water, and the temperature was raised to 50° C. while stirring using a dissolver. After that, 5300 g of an aqueous solution of sodium hypochlorite (effective chlorine concentration=12%) was instilled in over 3.5 hours at 50 to 60° C. while pulverizing with a sand mill using zirconia beads of diameter 0.8 mm. The pulverization with the sand mill was then continued for a further 30 minutes, thus obtaining a reaction liquid containing modified carbon black. This reaction liquid was filtered using 400 mesh wire netting, thus separating the zirconia beads and unreacted carbon black from the reaction liquid. A potassium hydroxide 5% aqueous solution was added to the reaction liquid obtained through the separation to adjust the pH to 7.5. Desalination and purification were then carried out using an ultrafilter membrane until the electrical conductivity of the liquid reached 1.5 mS/cm. Desalination and purification were then further carried out using an electrodialyser until the electrical conductivity of the liquid reached 1.0 mS/cm. The liquid was then concentrated until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining modified carbon black dispersion A.

Example 2

Preparation of Dispersion B 500 g of a carbon black raw material powder prepared using the furnace method (primary particle diameter=16 nm, BET specific surface area=215 m²/g, DBP oil absorption=210 mL/100 g) was added into 3750 g of ion exchange water, and the temperature was raised to 50° C. while stirring using a dissolver. After that, 7000 g of an aqueous solution of sodium hypochlorite (effective chlorine concentration=12%) was instilled in over 3.5 hours at 50 to 60° C. while pulverizing with a sand mill using zirconia beads of diameter 0.8 mm. The pulverization with the sand mill was then continued for a further 30 minutes, thus obtaining a reaction liquid containing modified carbon black. This reaction liquid was filtered using 400 mesh wire netting, thus separating the zirconia beads and unreacted carbon black from the reaction liquid. A sodium hydroxide 5% aqueous solution was added to the reaction liquid obtained through the separation to adjust the pH to 7.5. Desalination and purification were then carried out using an ultrafilter membrane until the electrical conductivity of the liquid reached 1.5 mS/cm. Desalination and purification were then further carried out using an electrodialyser until the electrical conductivity of the liquid reached 1.0 mS/cm.

The liquid was then concentrated until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining modified carbon black dispersion B.

Example 3

Preparation of Dispersion C 500 g of a carbon black raw material powder prepared using the furnace method (primary particle diameter=17 nm, BET specific surface area=200 m²/g, DBP oil absorption=185 mL/100 g) was added into 3750 g of ion exchange water, and the temperature was raised to 50° C. while stirring using a dissolver. After that, 5400 g of an aqueous solution of sodium hypochlorite (effective chlorine concentration=12%) was instilled in over 3.5 hours at 50 to 60° C. Immediately after the instillation had been completed, glass beads of diameter 3 mm were added, and stirring was carried out for 30 minutes at 50° C., thus obtaining a reaction liquid containing modified carbon black. This reaction liquid was filtered using 400 mesh wire netting, thus separating the glass beads and unreacted carbon black from the reaction liquid. A sodium hydroxide 5% aqueous solution was added to the reaction liquid obtained through the separation to adjust the pH to 7.5. Desalination and purification were then carried out using an ultrafilter membrane until the electrical conductivity of the liquid reached 1.5 mS/cm. Desalination and purification were then further carried out using an electrodialyser until the electrical conductivity of the liquid reached 1.0 mS/cm. The liquid was then concentrated until the modified carbon black concentration became 17 wt %.

The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining modified carbon black dispersion C.

Next, examples in which dispersions outside the scope of application of the present invention were prepared will be shown as Comparative Examples 1 to 4.

Comparative Example 1

Preparation of Dispersion D 500 g of a carbon black raw material powder (primary particle diameter=20 nm, BET specific surface area=124 m²/g, DBP oil absorption=165 mL/100 g) was added into 3750 g of ion exchange water, and the temperature was raised to 50° C. while stirring using a dissolver. After that, 2250 g of an aqueous solution of sodium hypochlorite (effective chlorine concentration=12%) was instilled in over 3.5 hours at 50 to 60° C. while pulverizing with a sand mill using zirconia beads of diameter 0.8 mm. The pulverization with the sand mill was then continued for a further 30 minutes, thus obtaining a reaction liquid containing modified carbon black. This reaction liquid was filtered using 400 mesh wire netting, thus separating the zirconia beads and unreacted carbon black from the reaction liquid. A sodium hydroxide 5% aqueous solution was added to the reaction liquid obtained through the separation to adjust the pH to 7.5. Desalination and purification were then carried out using an ultrafilter membrane until the electrical conductivity of the liquid reached 1.5 mS/cm. The liquid was then concentrated until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining modified carbon black dispersion D.

Comparative Example 2

Preparation of Dispersion E 500 g of a carbon black raw material powder (primary particle diameter=40 nm, BET specific surface area=56 m²/g, DBP oil absorption=122 mL/100 g) was added into 3750 g of ion exchange water, and the temperature was raised to 50° C. while stirring using a dissolver. After that, 1700 g of an aqueous solution of sodium hypochlorite (effective chlorine concentration=12%) was instilled in over 3.5 hours at 50 to 60° C. while pulverizing with a sand mill using zirconia beads of diameter 0.8 mm. The pulverization with the sand mill was then continued for a further 30 minutes, thus obtaining a reaction liquid containing modified carbon black. This reaction liquid was filtered using 400 mesh wire netting, thus separating the zirconia beads and unreacted carbon black from the reaction liquid. A sodium hydroxide 5% aqueous solution was added to the reaction liquid obtained through the separation to adjust the pH to 7.5. Desalination and purification were then carried out using an ultrafilter membrane until the electrical conductivity of the liquid reached 1.5 mS/cm. The liquid was then concentrated until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining carbon black dispersion E.

Comparative Example 3

Preparation of Dispersion F 500 g of a carbon black raw material powder (primary particle diameter=19 nm, BET specific surface area=145 m²/g, DBP oil absorption=125 mL/100 g) was added into 3750 g of ion exchange water, and the temperature was raised to 50° C. while stirring using a dissolver. After that, an aqueous solution of 4500 g of sodium hypochlorite (effective chlorine concentration=12%) was instilled in over 3.5 hours at 50 to 60° C. while pulverizing with a sand mill using zirconia beads of diameter 0.8 mm. The pulverization with the sand mill was then continued for a further 30 minutes, thus obtaining a reaction liquid containing modified carbon black. This reaction liquid was filtered using 400 mesh wire netting, thus separating the zirconia beads and unreacted carbon black from the reaction liquid. A sodium hydroxide 5% aqueous solution was added to the reaction liquid obtained through the separation to adjust the pH to 7.5, and then desalination and purification were carried out using an ultrafilter membrane until the electrical conductivity reached 1.5 mS/cm. The liquid was then concentrated until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining carbon black dispersion F.

Comparative Example 4

Preparation of Dispersion G 500 g of a carbon black raw material powder (primary particle diameter=19 nm, BET specific surface area=153 m²/g, DBP oil absorption=130 mL/100 g) was added into 3750 g of ion exchange water, and the temperature was raised to 50° C. while stirring using a dissolver. After that, an aqueous solution of 5500 g of sodium hypochlorite (effective chlorine concentration=12%) was instilled in over 3.5 hours at 50 to 60° C. while pulverizing with a sand mill using zirconia beads of diameter 0.8 mm. The pulverization with the sand mill was then continued for a further 30 minutes, thus obtaining a reaction liquid containing modified carbon black. This reaction liquid was filtered using 400 mesh wire netting, thus separating the zirconia beads and unreacted carbon black from the reaction liquid. A sodium hydroxide 5% aqueous solution was added to the reaction liquid obtained through the separation to adjust the pH to 7.5, and then desalination and purification were carried out using an ultrafilter membrane until the electrical conductivity reached 1.5 mS/cm. The liquid was then concentrated until the modified carbon black concentration became 17 wt %. The concentrated liquid was centrifuged, coarse particles were removed, and filtration was carried out with a 0.6 μm filter. Ion exchange water was added to the filtrate obtained, thus diluting until the modified carbon black concentration became 15 wt %, and dispersion was carried out, thus obtaining carbon black dispersion G.

An evaluation of properties was carried out as follows for the dispersions A to C of Examples 1 to 3 and the dispersions D to G of Comparative Examples 1 to 4.

(Measurement of Amounts of Lactone Groups and Carboxyl Groups Present in Modified Carbon Black)

The obtained modified carbon black was dried for 15 hours at 60° C., and using this carbon black, using an HP5890A (trade name, made by Hewlett-Packard) pyrolytic gas chromatograph, the lactone groups were decomposed at 358° C. and the carboxyl groups at 650° C., and the $CO_2$ produced was measured. The amounts of lactone groups and carboxyl groups present in the carbon black were calculated from the measurements.

(Method of Measuring Electrical Conductivity of Modified Carbon Black)

47.5 g of ion exchange water was added to 2.5 g of modified carbon black obtained by drying using the above method, and irradiation with ultrasound was carried out for 5 minutes. After that, stirring was carried out for 5 minutes, and then the electrical conductivity was measured.

(Measurement of Mean Particle Diameter of Modified Carbon Black)

For an aqueous solution prepared to a modified carbon black concentration of 0.065 wt %, the mean particle diameter was measured using a Microtrac 9340-UPA (trade name, made by Microtrac) particle size analyzer.

The evaluation results are shown in Table 1.

TABLE 1

| | | Example | | |
|---|---|---|---|---|
| | | 1 | 2 | 3 |
| Carbon black raw material powder | Amount of lactone groups present (μmol/g) | 35 | 41 | 51 |
| | Lactone groups/carboxyl groups | 0.75 | 0.77 | 0.71 |
| Modified carbon black | Amount of lactone groups present (μmol/g) | 737 | 711 | 648 |
| | Amount of carboxyl groups present (μmol/g) | 742 | 710 | 717 |
| | Lactone groups/carboxyl groups | 0.99 | 1.00 | 0.90 |
| | Mean particle diameter (nm) | 175 | 240 | 173 |
| | Electrical conductivity (mS/cm) | 0.48 | 0.52 | 0.45 |

TABLE 1-continued

| | | Comparative Example | | | |
|---|---|---|---|---|---|
| | | 1 | 2 | 3 | 4 |
| Carbon black raw material powder | Amount of lactone groups present (μmol/g) | 18 | 16 | 20 | 10 |
| | Lactone groups/carboxyl groups | 0.48 | 0.59 | 0.60 | 0.43 |
| Modified carbon black | Amount of lactone groups present (μmol/g) | 210 | 160 | 420 | 255 |
| | Amount of carboxyl groups present (μmol/g) | 350 | 280 | 670 | 780 |
| | Lactone groups/carboxyl groups | 0.60 | 0.62 | 0.63 | 0.33 |
| | Mean particle diameter (nm) | 205 | 280 | 170 | 185 |
| | Electrical conductivity (mS/cm) | 0.78 | 0.92 | 1.02 | 0.95 |

(Long-term Storage Tests Leaving at 70° C.)

Using the dispersions A to C obtained in Examples 1 to 3 and the dispersions D to G obtained in Comparative Examples 1 to 4, long-term storage tests were carried out in which the percentage changes in the viscosity and the mean particle diameter upon leaving for 5 weeks at 70° C. were measured.

(a) Measurement of Percentage Change in Viscosity of Dispersion Between Before and After Leaving for 5 Weeks at 70° C.

For each of a dispersion prepared to a modified carbon black concentration of 15 wt %, and such a dispersion after leaving for 5 weeks at 70° C., the viscosity was measured using an RE550L (trade name, made by Toki Sangyo Co., Ltd.) E-type viscometer, and the percentage change in the viscosity was calculated.

Percentage change in viscosity (%)=[(viscosity of dispersion after leaving−viscosity of dispersion before leaving)/viscosity of dispersion before leaving]×100    [Equation 2]

(b) Measurement of Percentage Change in Mean Particle Diameter of Carbon Black Between Before and After Leaving for 5 Weeks at 70° C.

Using dispersions before and after leaving for 5 weeks at 70° C., the mean particle diameter was measured for each using the method described earlier, and the percentage change in the mean particle diameter was calculated.

Percentage change in mean particle diameter (%)= [(mean particle diameter after leaving−mean particle diameter before leaving)/mean particle diameter before leaving]×100    [Equation 3]

The evaluation results are shown in Table 2.

TABLE 2

| | Example | | |
|---|---|---|---|
| | 1 | 2 | 3 |
| Percentage change in viscosity upon leaving for 5 weeks at 70° C. (%) | −5.9 | 3.4 | 6.2 |
| Percentage change in mean particle diameter upon leaving for 5 weeks at 70° C. (%) | 2.9 | −4.2 | 4.6 |

TABLE 2-continued

| | Comparative Example | | | |
|---|---|---|---|---|
| | 1 | 2 | 3 | 4 |
| Percentage change in viscosity upon leaving for 5 weeks at 70° C. (%) | 90.0 | 84.2 | 29.0 | 48.0 |
| Percentage change in mean particle diameter upon leaving for 5 weeks at 70° C. (%) | 26.8 | 23.2 | 16.6 | 20.3 |

As is clear from Table 2, the carbon black dispersions using the modified carbon blacks of the Examples are stable, but with the carbon black dispersions using the modified carbon blacks of the Comparative Examples, there were problems with the long-term storage-stability.

Examples in which water-based inks of different ink compositions (α composition and β composition) were manufactured are shown in Table 3. Regarding the carbon black dispersions, as shown in Table 3, the previously described dispersions A to C were used for the water-based inks of the Examples, and the previously described dispersions D to G were used for the water-based inks of the Comparative Examples.

(1) Water-Based Ink Composition: Preparation of α Composition 32.7 g of ion exchange water, 7 g of glycerol, and 7 g of diethylene glycol mono-n-butyl ether were added to 23.3 g of the carbon black dispersion, and stirring was carried out. The mixture was filtered using a Membrane Filter (trade name, made by Millipore) made of polytetrafluoroethylene with a pore size of 5 μm, thus preparing a water-based ink.

(2) Water-Based Ink Composition: Preparation of β Composition 26.8 g of ion exchange water, 7 g of glycerol, 2.1 g of triethylene glycol mono-n-butyl ether, 0.7 g of Olfine E1010 (trade name, made by Nissin Chemical Industry Co., Ltd.), and 0.7 g of triethanolamine were added to 32.7 g of the carbon black dispersion, and stirring was carried out. The mixture was filtered using a Membrane Filter (trade name, made by Millipore) made of polytetrafluoroethylene with a pore size of 5 μm, thus preparing a water-based ink.

An evaluation of properties was carried out as follows for the water-based inks of Examples 4 to 9 and Comparative Examples 5 to 8.

(Method of Measuring Settling Rate of Water-Based Ink)

30 g of a liquid of the α composition was sealed in a settling tube, and centrifugation was carried out for 10 minutes with a gravity acceleration of 11000 G. 4 g of the supernatant was weighed out accurately, and was diluted in a 1 L measuring flask. Next, the diluted liquid was measured out into a 5 ml transfer pipette, and was diluted in a 100 mL measuring flask. The absorbance W1 of this liquid at a wavelength of 500 nm was measured. The absorbance W0 upon similarly diluting the prepared liquid before centrifugation was measured, and the settling rate was calculated from the following formula.

Settling rate (%)=(1−[absorbance $W1$/absorbance $W0$])×100   [Equation 4]

(Observation of Whether or Not There is Settling Upon Leaving Water-Based Ink)

50 g of the water-based ink was left for half a year at room temperature, and then visual observation was carried out to determine whether or not settling had taken place.

(Reflection Density of Printed Article Printed Using Water-Based Ink)

The obtained water-based ink was filled into an EM-900C (trade name, made by Seiko Epson Corporation) ink jet recording apparatus, adjustment was carried out such that the amount applied of the ink would be 1 mg/cm$^2$, and printing was carried out on Xerox-P (trade name, made by Fuji Xerox) neutral plain paper. After drying the printed article, the reflection density (OD value) was measured using a Macbeth TR-927 (trade name, made by Kollmorgen Corporation) densitometer.

The evaluation results are shown in Table 3.

TABLE 3

|  |  | Example | | |
|---|---|---|---|---|
| Ink composition |  | 4 | 5 | 6 |
| α composition | Carbon black dispersion | A | B | C |
|  | Settling rate (%) | 23 | 25 | 21 |
|  | Settling upon leaving? | No | No | No |
|  | OD value of printed article | 1.48 | 1.49 | 1.46 |

|  |  | Comparative Example | | | |
|---|---|---|---|---|---|
| Ink composition |  | 5 | 6 | 7 | 8 |
| α composition | Carbon black dispersion | D | E | F | G |
|  | Settling rate (%) | 70 | 97 | 50 | 60 |
|  | Settling upon leaving? | Yes | Yes | Yes | Yes |
|  | OD value of printed article | 1.34 | 1.35 | 1.37 | 1.37 |

|  |  | Example | | |
|---|---|---|---|---|
| Ink composition |  | 7 | 8 | 9 |
| β composition | Carbon black dispersion | A | B | C |
|  | Settling upon leaving? | No | No | No |
|  | OD value of printed article | 1.42 | 1.41 | 1.40 |

As is clear from Table 3, with the water-based inks prepared using the modified carbon blacks of the Examples, there was no settling of the carbon black over a long period, and a deep black color was obtained upon printing. With the water-based inks prepared using the modified carbon blacks of the Comparative Examples, there were problems with the long-term storage stability, with the carbon black settling.

A modified carbon black dispersion of the present invention can be mass-produced simply, and the carbon black can be dispersed homogeneously in water even if a dispersant or surfactant is not used. Because a polymeric dispersant is not required, the modified carbon black dispersion has good storability, with the viscosity of the dispersion or the particle diameter of the carbon black not increasing, and is thus suitable for use in a water-based ink for which long-term stability is required.

A water-based ink containing a carbon black dispersion of the present invention is suitable for use in ink jet printers. The ink has good storage stability, with settling not being prone to occurring even upon storing for a long period, and hence has a long quality retention period. Moreover, clogging of the ink ejection nozzles of an ink jet printer is not prone to being brought about. Furthermore, if printing is carried out using this ink, then the printed characters or images have a high print density, and are of high quality with a vivid deep black color.

We claim:

1. A modified carbon black dispersion, which is a liquid having dispersed therein a modified carbon black obtained by subjecting a carbon black raw material powder to oxidation treatment, and is characterized in that the modified carbon black has on the surface thereof (a) carboxyl groups, and (b) lactone groups in a molar amount of at least 500 μmol/g relative to the weight of the modified carbon black and a molar ratio of 0.8 to 1.1 times the amount of the carboxyl groups.

2. The modified carbon black dispersion according to claim 1, characterized in that the molar amount of the carboxyl groups is at least 700 μmol/g relative to the weight of the modified carbon black.

3. The modified carbon black dispersion according to claim 2, characterized in that the mean particle diameter of the modified carbon black is 150 to 250 nm.

4. The modified carbon black dispersion according to claim 1, characterized in that the carbon black raw material powder already has on the surface thereof carboxyl groups, and lactone groups in a molar amount of at least 20 μmol/g relative to the weight of the carbon black raw material powder and a molar ratio of 0.65 to 1.1 times the amount of the carboxyl groups.

5. The modified carbon black dispersion according to claim 1, characterized in that the carbon black raw material powder has a primary particle diameter of 11 to 18 nm, a BET specific surface area of at least 180 m$^2$/g, and a DBP oil absorption of at least 180 mL/100 g.

6. The modified carbon black dispersion according to claim 1, characterized in that the carbon black raw material powder is subjected to the oxidation treatment using a hypohalous acid and/or a hypohalite.

7. The modified carbon black dispersion according to claim 6, characterized in that the carbon black raw material powder is subjected to the oxidation treatment using a hypohalous acid and/or a hypohalite having a chlorine amount relative to the surface area of the carbon black raw material powder of $0.6 \times 10^{-4}$ to $1.5 \times 10^{-4}$ mol/m$^2$.

8. The modified carbon black dispersion according to claim 1, characterized in that the percentage change in the mean particle diameter of the modified carbon black upon 5 weeks elapsing at 70° C. is not more than 15%.

9. The modified carbon black dispersion according to claim 1, characterized in that the percentage change in the viscosity upon 5 weeks elapsing at 70° C. is not more than 10%.

10. The modified carbon black dispersion according to claim 1, characterized in that after the oxidation treatment, the liquid obtained is subjected to desalinization, thus making the electrical conductivity of the modified carbon black contained therein be not more than 0.7 mS/cm.

11. A water-based ink, characterized by containing the modified carbon black dispersion according to claim 1.

12. The water-based ink according to claim 11, characterized in that the settling rate of the modified carbon black is not more than 30%.

13. The water-based ink according to claim 11, characterized by having a penetrability such that the penetration time upon applying the ink onto a recording medium in an amount of 1 mg/cm$^2$ is less than 1 second.

14. The water-based ink according to claim 11, characterized by having a surface tension at 20° C. of not more than 45 mN/m.

15. The water-based ink according to claim 11, characterized by containing a glycol butyl ether type water-soluble organic solvent.

16. The water-based ink according to claim 11, characterized by containing a nonionic surfactant.

17. The water-based ink according to claim 16, characterized in that the nonionic surfactant is an acetylene glycol surfactant.

18. A recording method, characterized by carrying out recording on a recording medium by attaching the water-based ink according to claim 11.

19. The recording method according to claim 18, characterized by being an ink jet recording method comprising carrying out printing by ejecting droplets of the water-based ink and attaching the droplets onto the recording medium.

20. A recorded article obtained by carrying out recording using the recording method according to claim 18.

* * * * *

UNITED STATES PATENT AND TRADEMARK OFFICE
CERTIFICATE OF CORRECTION

| | | |
|---|---|---|
| PATENT NO. | : 7,220,304 B2 | Page 1 of 1 |
| APPLICATION NO. | : 10/517951 | |
| DATED | : May 22, 2007 | |
| INVENTOR(S) | : Masayuki Momose et al. | |

It is certified that error appears in the above-identified patent and that said Letters Patent is hereby corrected as shown below:

On title page, item 54, delete "LIQUID" and "BASE" should read -- -BASED -- and insert Item -- (73) Assignee: Seiko Epson Corporation, Tokyo (JP) and Orient Chemical Industries, Ltd., Osaka-shi (JP) --.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

PATENT NO.         : 7,220,304 B2  
APPLICATION NO. : 10/517951  
DATED                 : May 22, 2007  
INVENTOR(S)       : Masayuki Momose et al.

It is certified that error appears in the above-identified patent and that said Letters Patent is hereby corrected as shown below:

On title page, item 54, and Column 1, line 2 delete "LIQUID" and "BASE" should read -- -BASED -- and insert Item -- (73) Assignee: Seiko Epson Corporation, Tokyo (JP) and Orient Chemical Industries, Ltd., Osaka-shi (JP) --.

This certificate supersedes the Certificate of Correction issued October 7, 2008.

Signed and Sealed this

Twenty-first Day of October, 2008

JON W. DUDAS  
*Director of the United States Patent and Trademark Office*